(12) United States Patent
Hyun

(10) Patent No.: US 10,219,499 B2
(45) Date of Patent: Mar. 5, 2019

(54) FISHING REEL EQUIPPED WITH SIDE COVER SAFETY LOCK

(71) Applicant: DOYO ENGINEERING CO., LTD., Bucheon (KR)

(72) Inventor: Kang Ho Hyun, Bucheon (KR)

(73) Assignee: DOYO ENGINEERING CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/863,077

(22) Filed: Jan. 5, 2018

(65) Prior Publication Data

US 2018/0199553 A1 Jul. 19, 2018

(30) Foreign Application Priority Data

Jan. 13, 2017 (KR) ........................ 10-2017-0005942

(51) Int. Cl.
*A01K 89/01* (2006.01)

(52) U.S. Cl.
CPC .............................. *A01K 89/01124* (2015.05)

(58) Field of Classification Search
CPC ............ A01K 89/01123; A01K 89/105; A01K 89/01921
See application file for complete search history.

(56) References Cited

U.S. PATENT DOCUMENTS

| | | | | |
|---|---|---|---|---|
| 3,348,788 | A * | 10/1967 | Vinokur | A01K 89/012 242/225 |
| 3,473,753 | A * | 10/1969 | Hull | A01K 89/0102 242/311 |
| 6,394,381 | B1 * | 5/2002 | Hirayama | A01K 89/01557 242/289 |
| 2005/0224617 | A1 * | 10/2005 | Nakagawa | A01K 89/01922 242/310 |
| 2007/0246590 | A1 * | 10/2007 | Hyun | A01K 89/0192 242/310 |
| 2010/0288866 | A1 * | 11/2010 | Nakagawa | A01K 89/0155 242/289 |
| 2015/0076269 | A1 * | 3/2015 | Niitsuma | A01K 89/015 242/249 |
| 2015/0076270 | A1 * | 3/2015 | Ikebukuro | A01K 89/015 242/249 |

FOREIGN PATENT DOCUMENTS

KR 100652842 11/2006

* cited by examiner

*Primary Examiner* — Emmanuel M Marcelo
(74) *Attorney, Agent, or Firm* — Cantor Colburn LLP

(57) ABSTRACT

Provided is a fishing reel with a side cover safety lock and, more particularly, a fishing reel with a safety lock that automatically returns a lock lever such that a locking projection of the lock lever is locked into a locking groove of a frame in order to prevent a side cover from unlocking and separating by performing a safety lock mode by operating the lock lever for locking the side cover when the side cover is recombined after being separated.

4 Claims, 14 Drawing Sheets

FISHING REEL EQUIPPED WITH SIDE COVER SAFETY LOCK

CROSS REFERENCE TO RELATED APPLICATION

The present application claims priority to Korean Patent Application No. 10-2017-0005942, filed Jan. 13, 2017, the entire contents of which is incorporated herein for all purposes by this reference.

BACKGROUND OF THE INVENTION

Field of the Invention

The present invention relates to a fishing reel with a side cover safety lock and, more particularly, a fishing reel with a safety lock that automatically returns a lock lever such that a locking projection of the lock lever is locked into a locking groove of a frame in order to prevent a side cover from unlocking and separating by performing a safety lock mode by operating the lock lever for locking the side cover when the side cover is recombined after being separated.

Description of the Related Art

Users may open, separate, and recombine a side cover of a fishing reel while fishing and then keep fishing under various situations, for example, separating a spool to maintain the fishing reel or regulating a centrifugal brake shoe to prevent backlash, when the user fishes not only on a flat ground area, but a slope such as a rock.

Fishing reels have various coupling structures for opening and closing a side cover and the essential purpose of the structures for opening and closing a side cover is to completely separate the side cover and then recombine and safely fix the side cover.

Representatively, an apparatus for coupling a bait casting reel has been disclosed in Korean Patent No. 10-0652842. The apparatus can lock and unlock a reel cover (side cover) only by rotating the reel cover with respect to a reel body (frame) using a small force even without operating a specific lock when coupling and decoupling the reel cover to and from the reel body.

As in this apparatus, according to the fishing reels of the related art, a user has to manually operate a specific lock into the on-state in order to completely fix a side cover after recombining the side cover that has been separated.

In general, when side covers of fishing reels are recombined, the side covers are partially coupled to the frames and maintained in the state even before a lock is operated into the on-state, so if a user restarts without a side cover completely fixed, the side cover may be unlocked, separated, and lost during fishing.

In particular, according to fishing reels of which the side cover is separated and coupled by rotating a specific lock lever without rotating the side cover itself, the side cover looks completely fixed to the frame even though the lock lever is not operated in the lock state, so a user is likely to wrongly assess the locking state, so the possibility of losing the side cover is increased.

SUMMARY OF THE INVENTION

The present invention has been made in an effort to solve the problems and an object of the present invention is to provide a fishing reel with a side cover safety lock that performs a safety lock mode of a lock lever by automatically returning the lock lever such that a locking projection of the lock lever is locked into a locking groove of a frame when the side cover is recombined with the frame, in order to prevent the side cover from being unlocked, separated, and lost when a user needs to open and close the side cover during fishing and restarts fishing without completely fixing the side cover.

In order to achieve the objects of the present invention, a fishing reel with a side cover safety lock according to an aspect of the present invention includes: a frame having locking grooves; a side cover detachably coupled to a first side of the frame; a lock lever coupled to the side cover to rotate in two directions and having a grip and locking projections selectively locked into the locking grooves when the lock lever is rotated in two directions through the grip; and a safety lock preventing separation of the side cover by rotating the lock lever such that the locking projections are locked into the locking grooves when the side cover is recombined with the frame after being separated, in which, the safety lock includes: a torsion spring elastically supporting and rotating the lock lever in a locking direction and an unlocking direction from a dead point to prevent the lock lever from returning by applying elasticity in the unlocking direction when the lock lever is rotated to separate the side cover and to allow the lock lever to return by applying elasticity in the locking direction when the side cover is recombined with the frame after being separated; and a trigger pressing the lock lever beyond the dead point such that the lock lever is returned by the torsion spring when the side cover is recombined with the frame after being separated.

The trigger may have an operating portion having a pressed surface connected to the lock lever and a pushing projection formed on the frame to correspond to the pressed surface, so when the side frame is recombined with the frame after being separated, the pushing projection presses the operating portion and the lock lever is returned.

The trigger may have an operating portion having a pressed surface connected to the lock lever and a pushing pin coupled to the side cover to move up and down and having a pressing surface corresponding to the pressed surface, so when the side frame is recombined with the frame after being separated, the pushing pin is pressed by the frame and presses the operating portion and the lock lever is returned.

A fishing reel with a side cover safety lock according to another aspect of the present invention includes: a frame having locking grooves; a side cover detachably coupled to an outer side of the frame; a lock lever coupled to the side cover to rotate in two directions and having a grip and locking projections selectively locked into the locking grooves when the lock lever is rotated in two direction through the grip; and a safety lock preventing separation of the side cover by rotating the lock lever such that the locking projections are locked into the locking grooves when the side cover is recombined with the frame after being separated, in which the safety lock may include: an elastic body elastically supporting the lock lever in the locking direction; and a lock spring locking the lock lever such that the lock lever is prevented from returning by the elastic body when the lock lever is rotated to separate the side cover, and releasing the lock lever such that the lock lever is returned by the elastic body when the side cover is recombined with the frame after being separated.

The fishing reel according to the present invention is equipped with the safety lock, which always forces locking rotation of the lock lever using a torsion spring or a tension spring and includes a trigger or a lock spring for allowing the lock lever to be automatically returned by the torsion spring or the tension spring when the side cover is recombined with the frame after being separated, so even if a user separates and recombine the side cover during fishing and then restarts fishing without completely locking the side cover, the safety lock mode of the lock lever is performed, whereby it is possible to keep the side cover locked and prevent loss of the side cover due to unlocking and separating of the side cover.

Further, according to the fishing reel of the present invention, the safety lock mode of the lock lever is automatically performed only by primarily coupling the side cover to the frame without a specific operation, so it is possible to easily and conveniently recombine and use the side cover after separating it.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
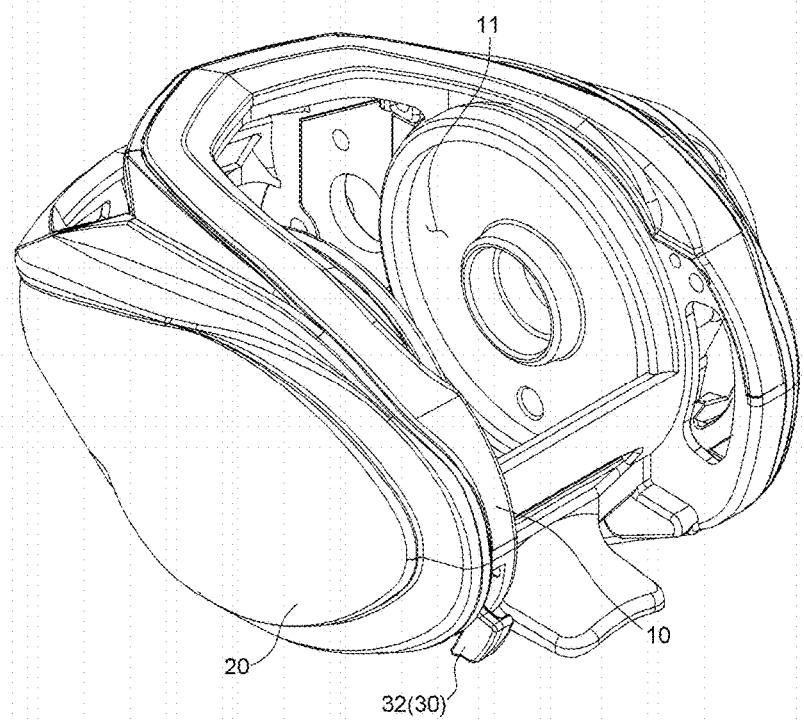
FIG. 1 is a perspective view showing the external appearance of a fishing reel according to the present invention.
Figure 2A:
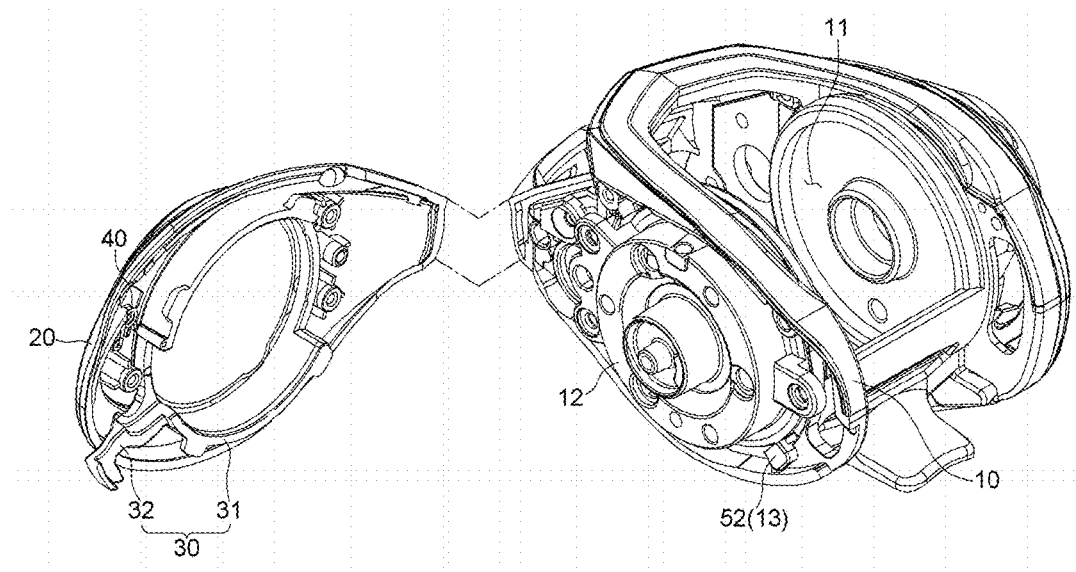
FIGS. 2A and 2B are primary exploded perspective views of a first embodiment of the fishing reel according to the present invention.
Figure 2B:
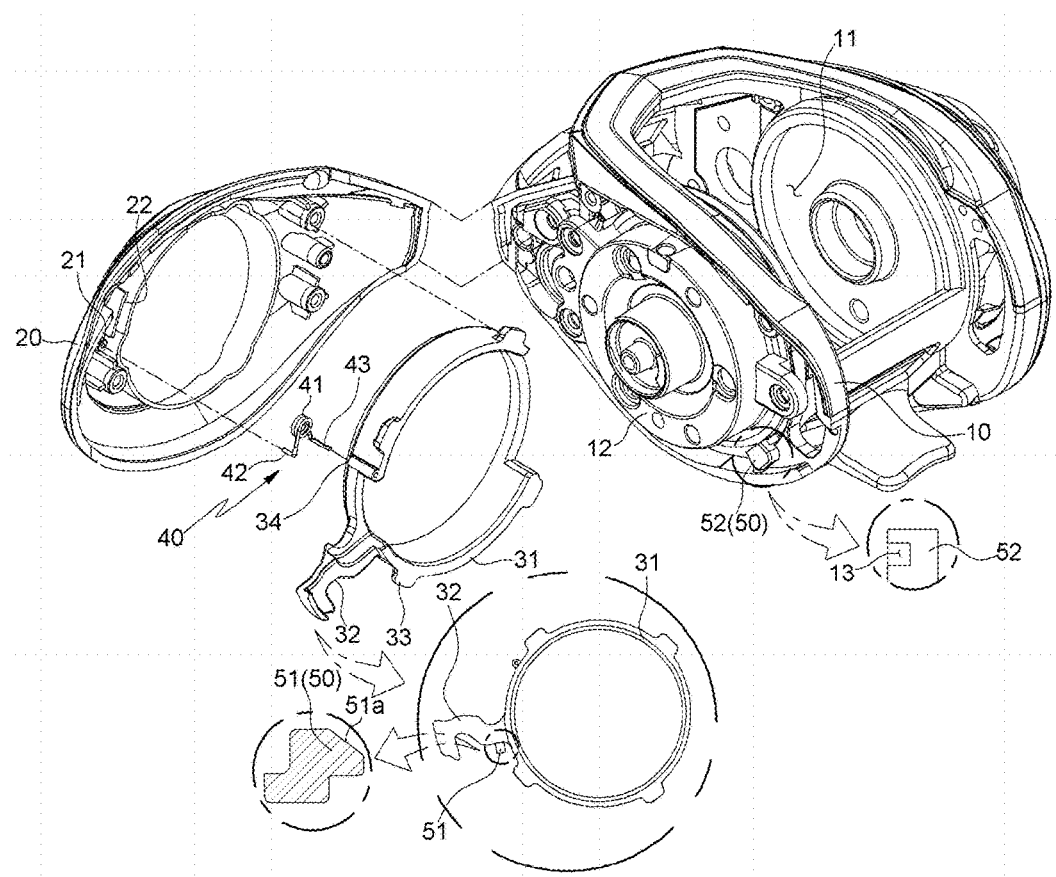

The present invention may be modified in various ways and implemented by various exemplary embodiments, so aspects (or specific exemplary embodiments) are shown in the drawings and will be described in detail. However, it is to be understood that the present invention is not limited to the specific exemplary embodiments, but includes all modifications, equivalents, and substitutions included in the spirit and the scope of the present invention.

In the figures, like reference numerals, particularly, reference numerals having the same last two digits or the same last two digits and letters refer to like elements having like functions throughout, and unless the context clearly indicates otherwise, elements referred to by reference numerals of the drawings should be understood based on this standard Also, for convenience of understanding of the elements, in the figures, sizes or thicknesses may be exaggerated to be large (or thick), may be expressed to be small (or thin) or may be simplified for clarity of illustration, but due to this, the protective scope of the present invention should not be interpreted narrowly.

The terminology used herein is for the purpose of describing particular aspects (or embodiments) only and is not intended to be limiting of the present invention. Singular forms are intended to include plural forms unless the context clearly indicates otherwise.

It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by one of ordinary skill in the art to which the present invention belongs. It will be further understood that terms used herein should be interpreted as having a meaning that is consistent with their meaning in the context of this specification and the relevant art and will not be interpreted in an idealized or overly formal sense unless expressly so defined herein.

Terms such as 'a first~' and 'a second~' are used only for the purpose for distinguishing a constitutive element from other constitutive element, but constitutive element should not be limited to a manufacturing order, and the terms described in the detailed description of the invention may not be consistent with those described in the claims.

For convenience of the description of a fishing reel with a side cover safety lock according to the present invention, when an approximate direction rather than a precise direction is specified with reference to FIGS. 2A, 2B, 5, and 8, a lower side is determined based on a direction to which gravity is applied, and up and down directions and right and left directions are determined based on the lower side. This standard may be also applied to the other drawings, and directions may be specified and described based on this standard unless the detailed description of the invention and the claims specially indicate otherwise.

Hereinbelow, a fishing reel with a side cover safety lock according to the present invention will be described with reference to the accompanying drawings.

The present invention relates to a fishing reel with a side cover safety lock that locks a lock lever 30 in a safety lock mode by automatically rotating the lock lever 30 in the locking direction when a separated side cover 20 is recombined.

FIG. 1 is a perspective view showing the external appearance of the present invention, FIGS. 2A to 4 are related to a first embodiment of the present invention, FIGS. 5 to 7B are related to a second embodiment of the present invention, and FIGS. 8 to 11C are related to a third embodiment of the present invention.

Referring to the figures, a fishing reel includes a frame 10 having a spool mount 11, a side cover 20 combined with the frame 10 to cover a spool cover 12 coupled to a side of the frame 10, a lock lever 30 disposed inside the side cover 20 to lock and unlock the side cover 20, and a safety lock automatically locking the lock lever in a safety lock mode when the side cover 20 is recombined with the frame 10 after being separated.

The frame 10 has the spool mount 11 at the center, a shaft (not shown) of a spool the disposed through both sides of the spool mount 11, the spool cover 12 for fixing the spool and the shaft is detachably coupled to an open spool cover mount formed at a first side of the frame 10 and a handle (not shown) that is operated with the shaft is disposed at a second side of the frame.

When the handle is operated, the spool fitted on the shaft is rotated forward or backward, so a fishing line wound on the spool is loosened or wound around the spool.

The side cover 20 is detachably attached to a mount on a side of the frame 10 to cover the spool cover 12.

It is possible to replace the spool or regulate a centrifugal spool brake (not shown) after detaching the side cover 20.

The frame 10 has a plurality of locking grooves 13 formed around the spool cover mount.

The lock lever 30 is composed of a rotor 31 fitted on the spool cover 12 to rotate in two directions on the side cover 20 and an outer grip 32 extending from the rotor 31 outside the fishing reel, and has a plurality of locking projections 33 formed around the rotor 31 to correspond to the locking grooves 13.

When the lock lever 31 is rotated in two directions through the grip 32, the locking projections 33 are selectively locked into the locking grooves 13.

Accordingly, the lock lever 30 is locked and unlocked, so the side cover is opened and closed to be attached to and detached from the frame 10.

When a user needs to separate the spool or adjust the position of a centrifugal brake shoe in order to maintain the fishing reel while fishing with the fishing reel, he/she separates and the recombines the side cover 20.

The main object of the present invention is to achieve easy attachment and detachment of the side cover 20 and prevent the side cover 20 from being unlocked and separated by locking the lock lever 30 in a safety lock mode when the side cover 20 is recombined.

To this end, the safety lock of the present invention prevents separation of the side cover 20 by rotating the lock lever 20 such that the locking projections 33 are locked into the locking grooves 13 when the side cover 20 is recombined with the frame 10 after being separated.

As shown in FIGS. 2A to 4, the safety lock includes:

a first torsion spring 40 elastically supporting and rotating the lock lever 30 in a locking direction and an unlocking direction from a dead point D to prevent the lock lever 30 from returning by applying elasticity in the unlocking direction when the lock lever 30 is rotated to separate the side cover 20 and to allow the lock lever 30 to return by applying elasticity in the locking direction when the side cover 20 is recombined with the frame 10 after being separated; and a trigger 50 pressing the lock lever 30 beyond the dead point D such that the lock lever 30 is returned by the first torsion spring 40 when the side cover 20 is recombined with the frame 10 after being separated.

The first torsion spring 40 has a circular center ring 41, a first coupling portion 42 extending from a first end of the circular center ring 41, and a second coupling portion 43 extending from a second end of the circular center ring 41, in which the first and second coupling portions 42 and 43 are elastically opened about the circular center ring 41.

The first coupling portion 42 is hingedly fitted in a first hole 21 of the side cover 20 and the second coupling portion 43 is hingedly fitted in a second hole 34 of the lock lever 30.

Accordingly, when the lock lever 30 is rotated in a first direction (counterclockwise in FIGS. 3A to 3C) through the grip 32, the locking projections 33 are separated out of the locking grooves 33 and the lock lever 30 is unlocked, in which the circular center ring 41 of the first torsion spring 40 is rotated on the coupling portions 42 and 43 and the coupling portions 42 and 43 are elastically opened.

When the second coupling portion 43 is moved beyond the dead point D by rotation of the lock lever 30, the opening direction of the coupling portions 42 and 43 becomes contrary to the return direction of the lock lever 30 and the elasticity of the first torsion spring 40 is applied in the unlocking direction of the lock lever 30 (counterclockwise in the figures) (that is, elasticity is generated by compression of the coupling portions and the lock lever 30 is pushed in the unlocking direction of the lock lever 30 by direction change of the coupling portions), so the lock lever 30 is prevented from returning in this state.

Only when the second coupling portion 43 is pressed to be positioned not beyond the dead point D, the elasticity of the first torsion spring 40 is applied in a locking direction of the lock lever 30 (clockwise in the figures), so the lock lever 30 is pressed to return to the initial position.

A first embodiment of the trigger 50 for automatically returning the lock lever 30 using the first torsion spring 40 is shown in FIGS. 2A to 4.

The trigger 50 is composed of an operating portion 51 having a pressed surface 51a connected to the lock lever 30 and a pushing projection 52 formed on the frame 10 to correspond to the pressed surface 51a.

When the side cover 20 is recombined after being separated, the push projection 52 presses the operating portion 51, whereby the lock lever 30 is returned.

The operating portion 51 protrudes from a side of the grip 32 of the lock lever 30 and the pressed surface 51a is formed to be inclined downward to a side of the top of the operating portion 51.

The pushing projection 52 protrudes on the outer side of the frame 10 at a position corresponding to the operating portion 51 when the lock lever 30 is fully rotated to the unlocked position.

The position of the pushing projection 52 may depend on the position of the operating portion 51 and it is exemplified in the drawing of the present invention that one of the projections having the locking grooves 13 functions as the pushing projection 52.

Figure 3A:
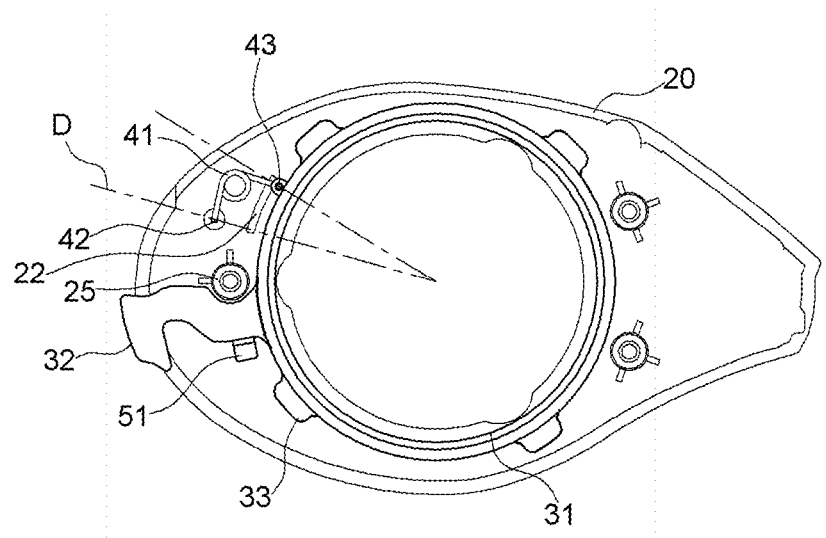
FIGS. 3A to 3C are side views showing main parts of the first embodiment of the present invention.
Figure 3B:
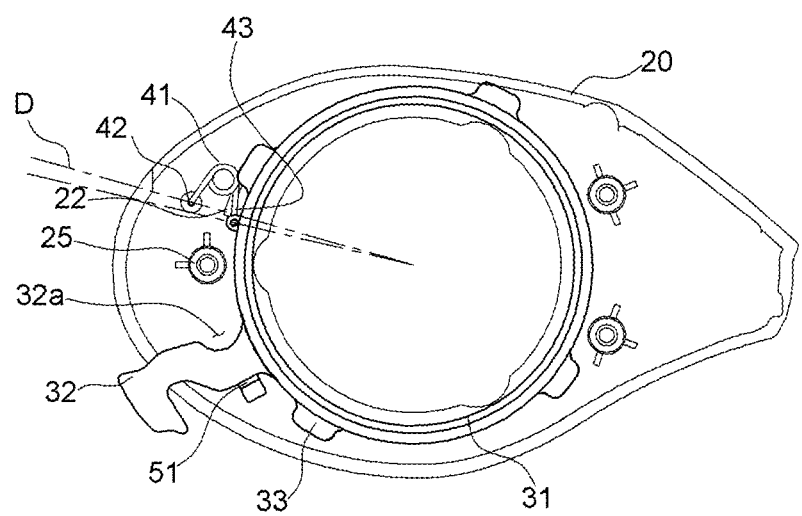

Accordingly, when the lock lever 30 is rotated in to an unlocked mode such that the second coupling portion 43 of the first torsion spring 40 is moved beyond the dead point D, as shown in FIG. 3B, from a locked mode of the lock lever 30 shown in FIG. 3A, the elasticity of the first torsion spring 40 is applied in the unlocking direction of the lock lever 30, so the locking projections 33 are separated out of the locking grooves 13 and the lock lever 30 unlocked and stopped.

When the side cover 20 that has been separated is recombined with the frame 10 in this state, the pushing projection 52 presses the pressed surface 51a of the operating portion 51 and the lock lever 30 is pushed back and rotated in the locking direction at a predetermined angle across the dead point D.

Figure 3C:
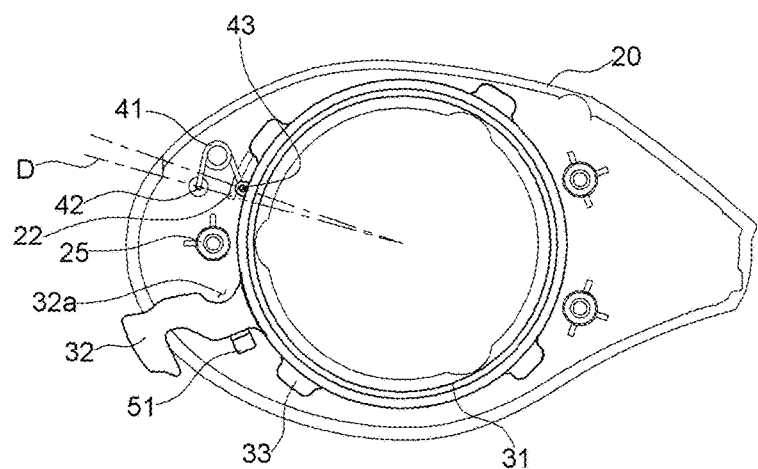
Figure 4:
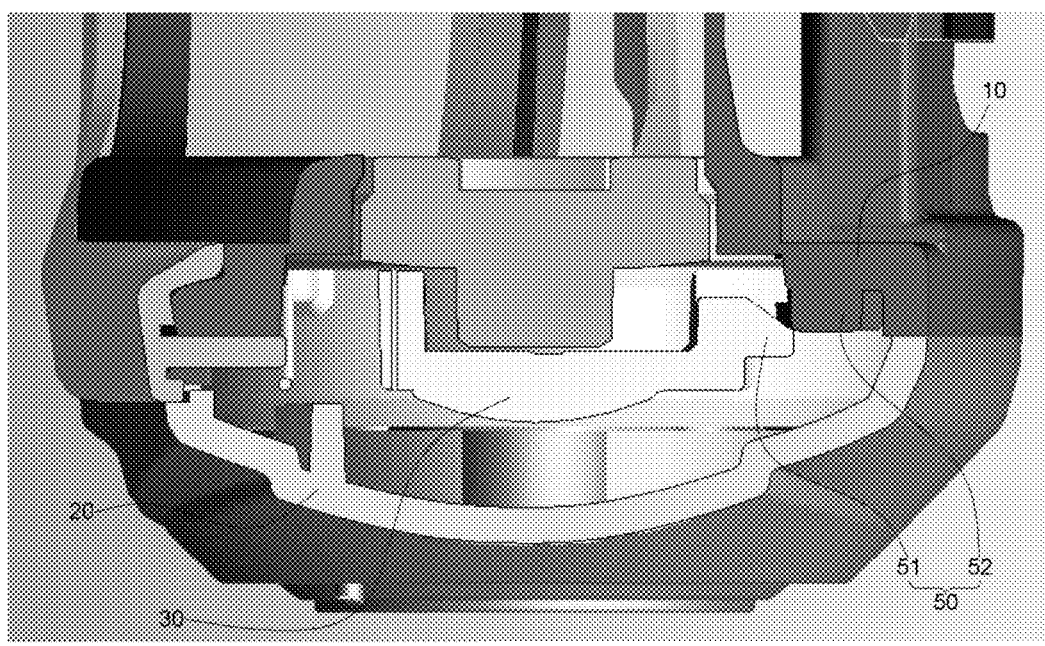
FIG. 4 is a side view showing main parts of the first embodiment of the present invention.
Figure 5:
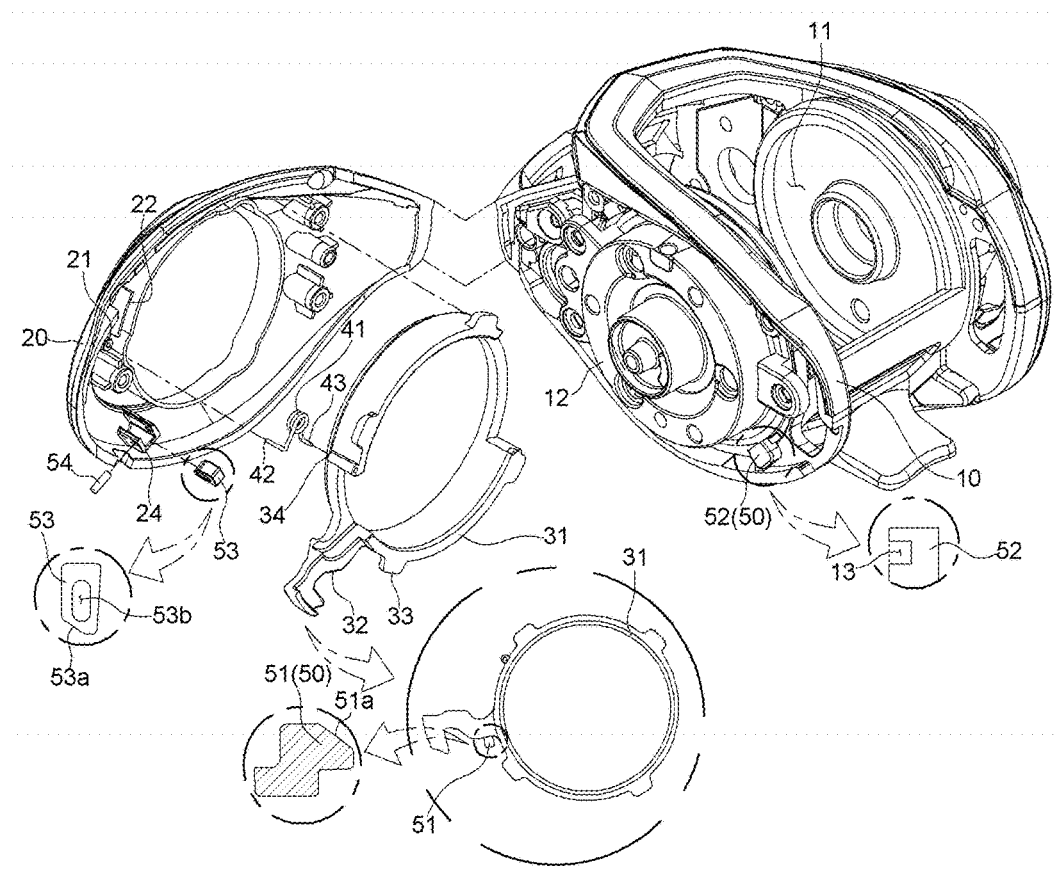
FIG. 5 is a primary exploded perspective view of a second embodiment of the fishing reel according to the present invention.

Accordingly, when the second coupling portion 43 of the first torsion spring 40 enters a locked mode area across the dead point D, the direction of the elasticity of the first torsion spring 40 is changed, that is, the elasticity of the first torsion spring 40 is applied in the locking direction of the lock lever 30. Further, as shown in FIG. 3C, the lock lever 30 is returned and the locking projections 33 are partially locked in the locking grooves 13 of the frame 10, whereby a safety lock mode in which the side cover 20 is prevented from separating is entered.

That is, the lock levers of common fishing reels are operated only in two steps of locked and unlocked modes, but the lock lever 30 of the present invention is operated in three steps of the locked mode, unlocked mode, and safety lock mode, so when the side cover 20 is recombined, unlocking and separating of the side cover 20 is primarily prevented in the safety lock mode.

Further, in the safety lock mode, the side cover 20 is fixed by the lock lever 30 by rotating again the lock lever 30 to the locked mode position.

On the contrary, when the side cover 20 is separated, the lock lever 30 is prevented from returning by the first torsion spring only by rotating the lock lever 30 to the unlocked mode position, so the side cover 20 can be separated. Further, the pressed surface 51a comes in contact with the pushing projection 52 and pushes outward the side cover 20, so the side cover 20 can be easily separated.

In other words, recombining of the side cover 20 after separation is performed through the process of locked mode—unlocked mode—safety lock mode—locked mode of the lock lever 30, and the safety lock mode is automatically performed with the side cover 20 primarily combined with the frame 10, so it is possible to prevent the side cover 20 from being unlocked and separated due to a mistake of a user etc.

Non-stated reference numeral '22' indicates a first guide 22 protruding from the inner side of the side cover to guide the second coupling portion 43. The first guide 22 is positioned such that the second coupling portion 43 can be moved beyond the dead point D so that the direction of elasticity can be changed by movement of the circular center ring 41, as described above.

Non-stated reference number '25' indicates a female coupling portion 25 protruding from the outer side of the frame 10 to receive a projection (not shown) of the frame 10 when the side cover 20 and the frame 10 are primarily combined.

In particular, the female coupling portion 25 formed at the locked mode position of the lock lever 30 prevents excessive rotation of the lock lever 30 by coming in contact with the grip 32 when the lock lever 30 is returned, and to this end, a groove 32a for receiving the female coupling portion 25 is formed on a second side of the grip 32.

Next, a second embodiment of the present invention is described with reference to FIGS. 5 to 7B.

The fundamental configuration of the second embodiment of the present invention is the same as that of the first embodiment.

However, the second embodiment includes a pushing pin 53 coupled to the side cover 20 to move up and down and having a pressing surface 53a corresponding to the pressed surface 51a, instead of the pushing projection 52.

When the side cover 20 is recombined after being separated, the pushing pin 53 is pressed by the frame 10 and presses the operating portion 51, whereby the lock lever 30 is returned.

That is, the pushing projection 52 on the frame 10 directly presses the operating portion 51 in the first embodiment, but the pushing pin 53 that is pressed by the frame 10 presses the operating portion 51 in the second embodiment.

To this end, a pushing pin seat 24 is formed on the inside of the side cover 20.

The pushing pin 53 inserted in the pushing pin seat 24 to move up and down has a longitudinal oblong hole 53b.

A shaft pin 54 in inserted in through the pushing pin seat 24 and the oblong hole 53b.

The pushing pin 53 is moved up and down with the shaft pin 53.

In the pushing pin 53, the pressing surface 53a pushing pin 53 that comes in contact with the operating portion 51 is inclined upward toward a second side from the bottom of the pushing pin 53.

Figure 6A:
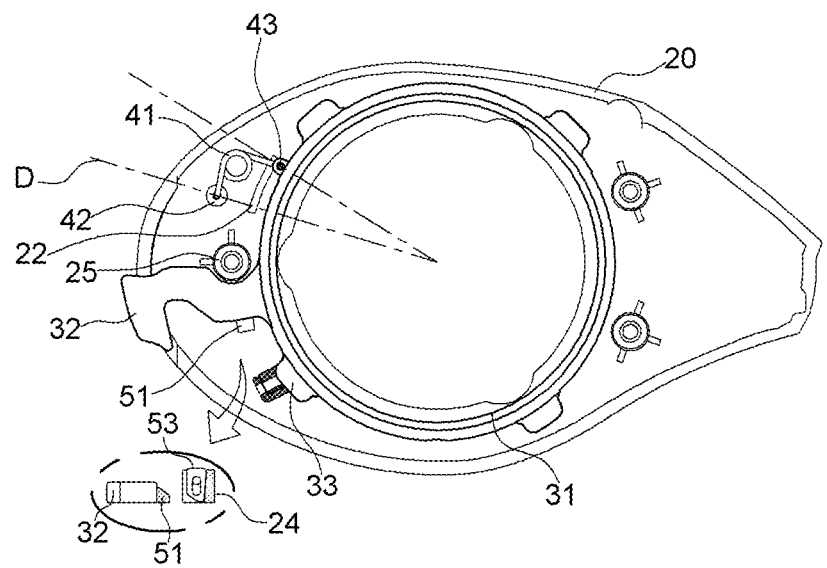
FIGS. 6A to 6C are side views showing main parts of the second embodiment of the present invention.
Figure 6B:
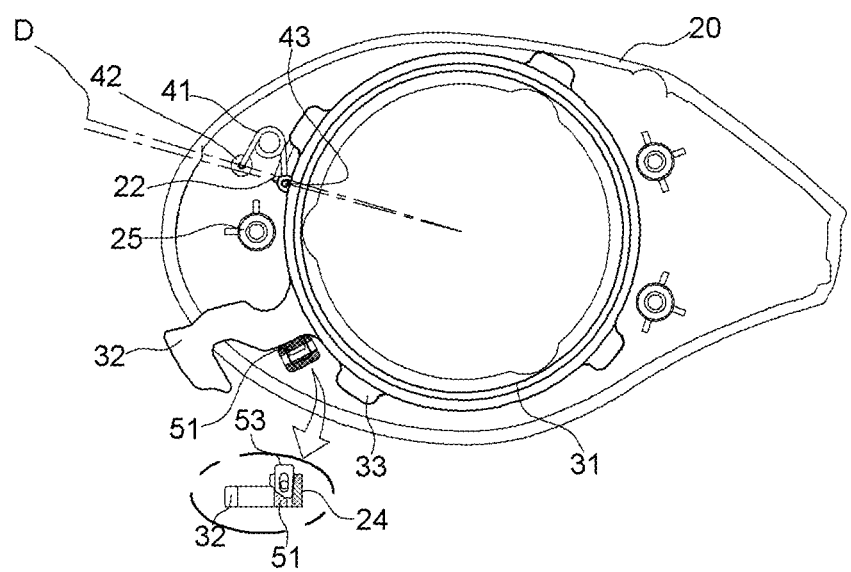

Accordingly, when the lock lever 30 is rotated into the unlocked mode such that the second coupling portion 43 of the first torsion spring 40 is moved beyond the dead point D, as shown in FIG. 6B, from the locked mode of the lock lever 30 shown in FIG. 6A, the pressed surface 51a comes in contact with the pressing surface 53a of the pushing pin 53 and moves up the pushing pin 53 and the pushing pin 53 moved up comes in contact with the frame 10 and pushes outward the side cover 20, so the side cover 20 can be easily separated.

Figure 6C:
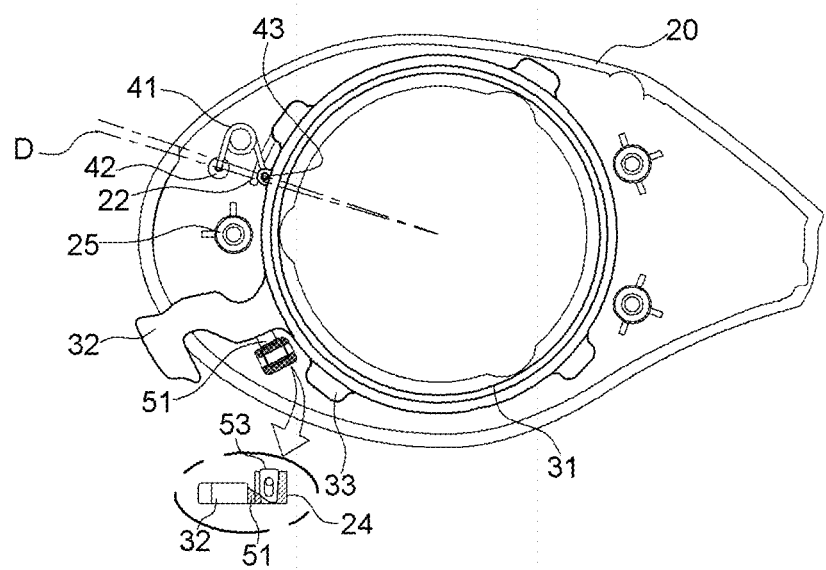
Figure 7A:
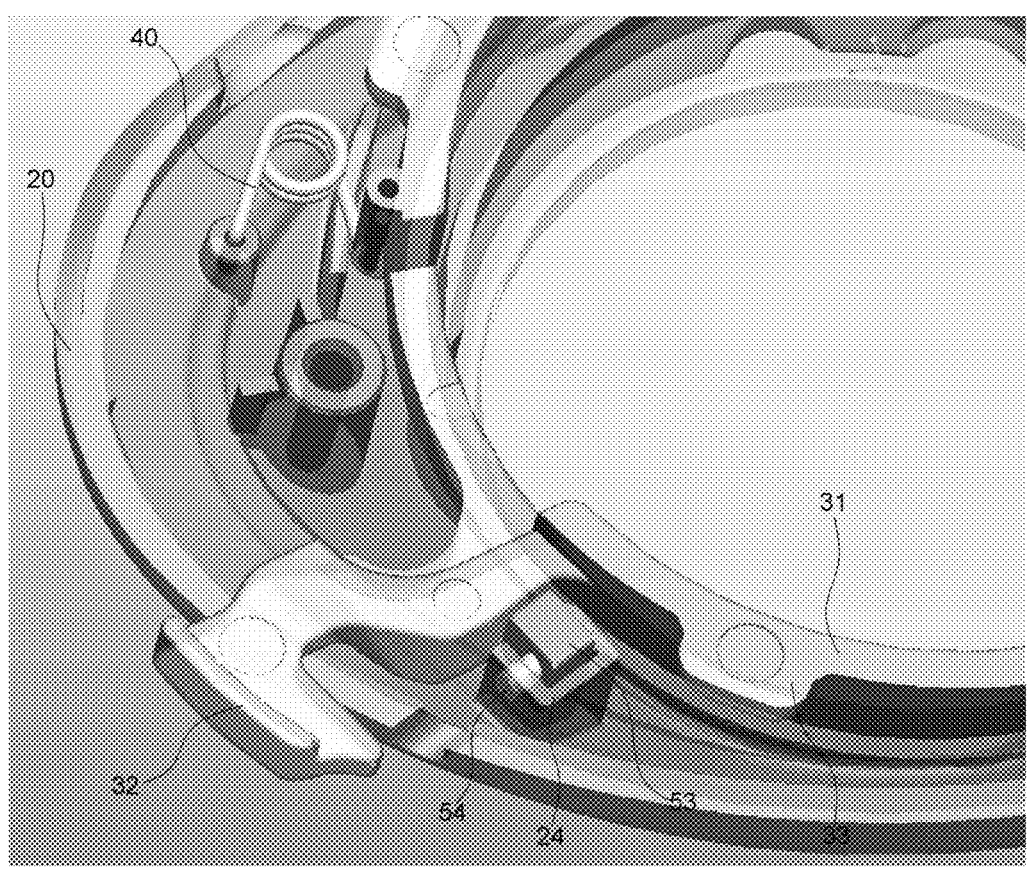
FIGS. 7A and 7B are side views showing main parts of the second embodiment of the present invention.
Figure 7B:
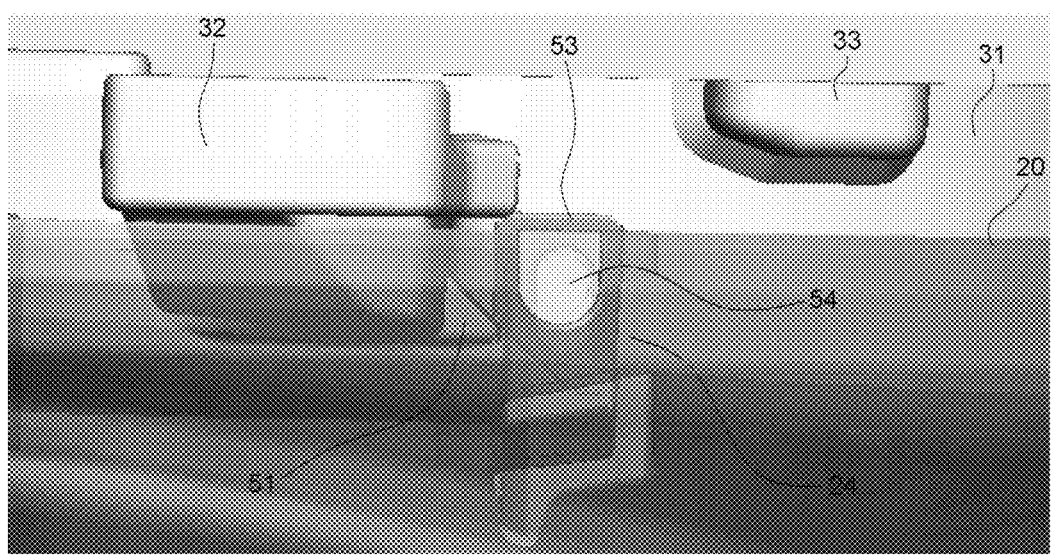

When the separated side cover 20 is recombined with the frame 10, the pushing pin 53 is pressed down by the frame and the pressing surface 53a presses the pressed surface 51a, so the lock lever 30 is pushed and rotated at a predetermined angle in the locking direction beyond the dead point D and is returned to the safety lock mode position by elasticity of the first torsion spring 40, as shown in FIG. 6C, whereby separation of the side cover 20 is primarily prevented.

Thereafter, when a user rotates again the lock lever 30 to the locked mode position, the side cover 20 is completely recombined.

The fundamental operation principle associated with direction change by elasticity of the first torsion spring 40 in the second embodiment is the same as that in the first embodiment, so the detailed description thereof is not provided.

Next, a third embodiment of the present invention is described with reference to FIGS. 8 to 11C.

The fundamental configuration of the third embodiment of the present invention is the same as those of the first and second embodiments.

However, the safety lock includes: instead of the first torsion spring 40 and the trigger 50, an elastic body elastically supporting the lock lever 30 in the locking direction; and a lock spring 60 locking the lock lever 30 such that the lock lever 30 is prevented from returning by the elastic body when the lock lever 30 is rotated to separate the side cover 20, and releasing the lock lever 30 such that the lock lever 30 is returned by the elastic body when the side cover 20 is recombined with the frame 10 after being separated.

That is, according to the first and second embodiments, when the side cover 20 is separated, the elasticity direction is changed by the configuration of the first torsion spring 40 and the lock lever 30 is pressed in the unlocking direction. Further, when the side cover 20 is recombined, the elasticity direction of the first torsion spring 40 is changed again by the pushing projection 52 or the pushing pin 53 and the lock lever 30 is pressed in the locking direction, so the lock lever 30 is returned.

However, according to the third embodiment, when the side cover 20 is separated, the lock lever 30 is locked and prevented from returning by the lock spring 60 with the elasticity of the elastic member maintained, and when the side cover 20 is recombined, the lock lever 30 locked by the lock spring 60 is released and returned by the elasticity of the elastic body.

To this end, the elastic body of the third embodiment has only to apply elasticity in one direction and is not limited in detailed type or coupling structure.

Figure 8:
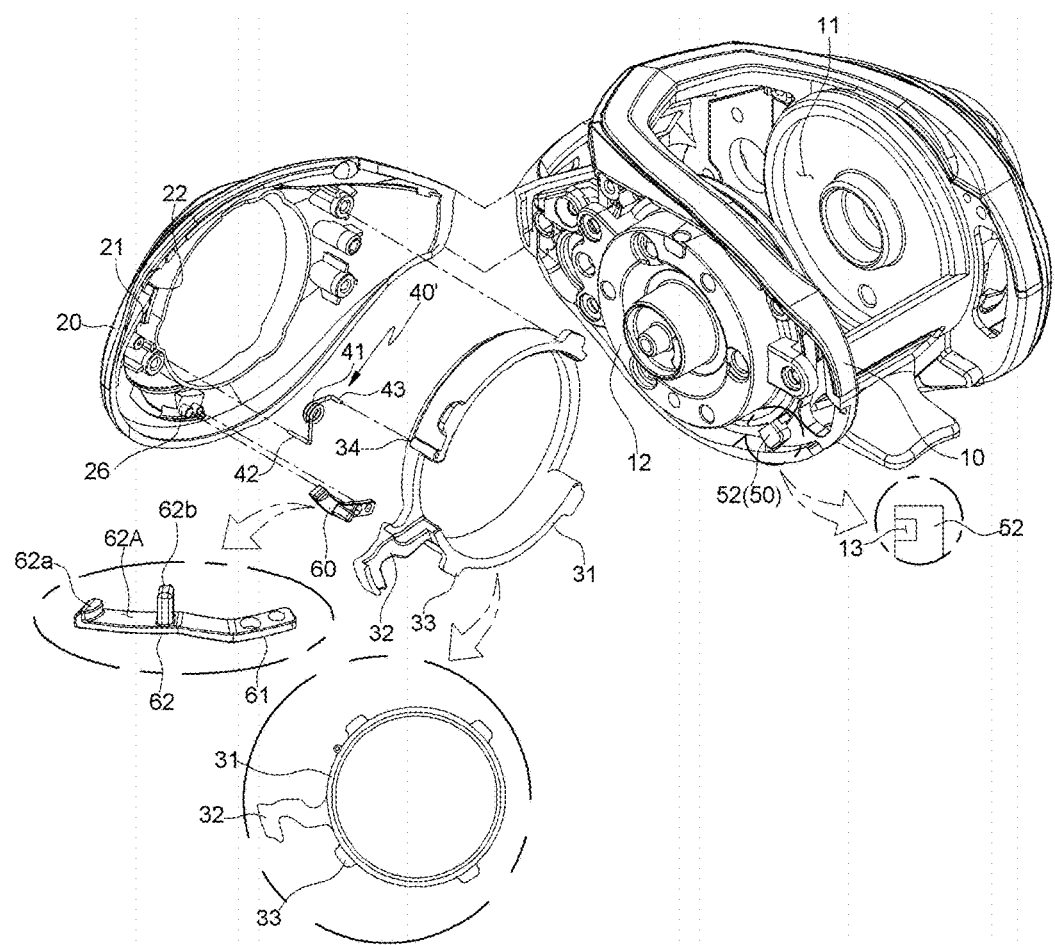
FIG. 8 is a primary exploded perspective view of a third embodiment of the fishing reel according to the present invention.
Figure 9A:
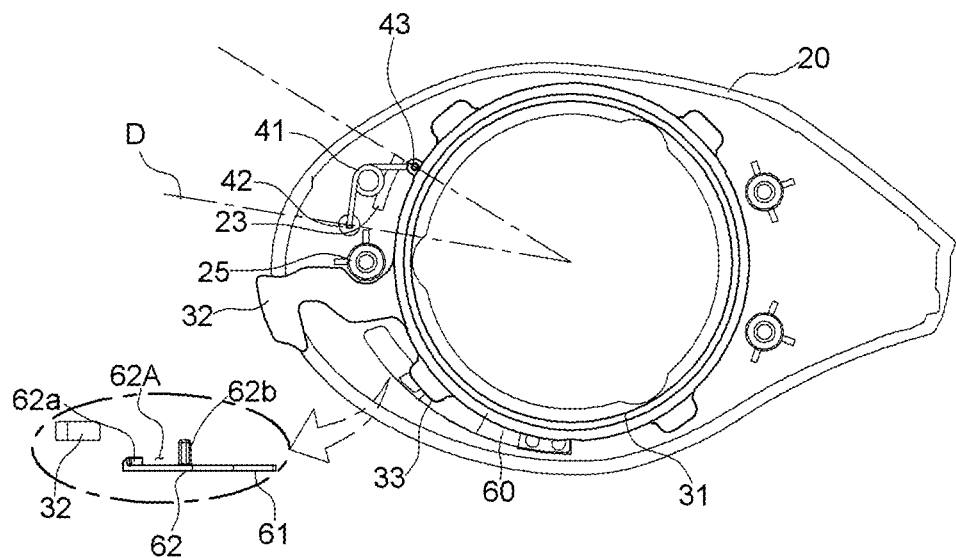
FIGS. 9A to 9C and 11A to 11C are side views showing main parts in structures for coupling springs in the third embodiment of the present invention.
Figure 9B:
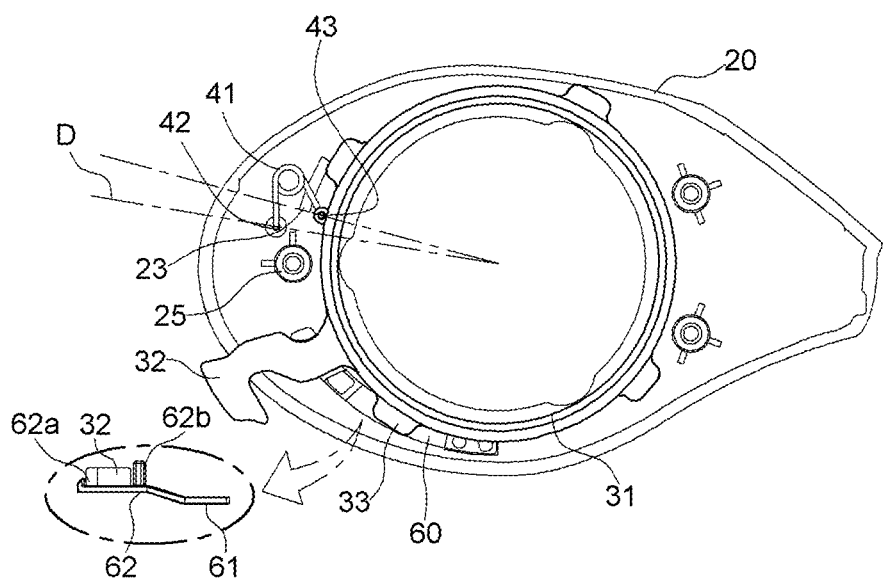
Figure 9C:
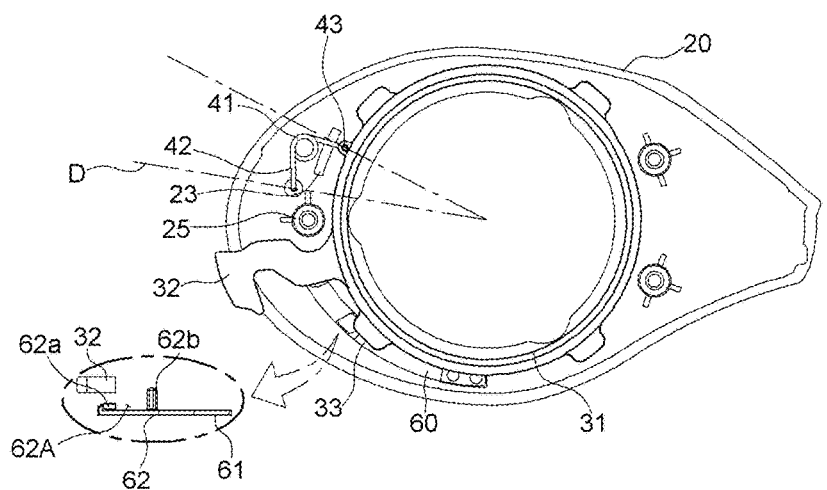
Figure 10:
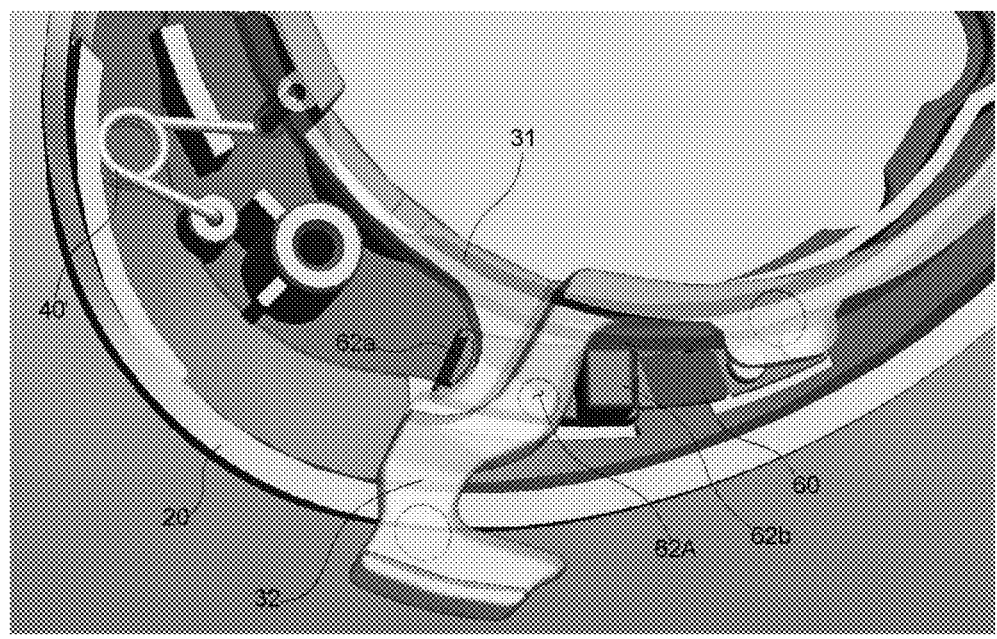
FIG. 10 is an enlarged view showing main parts of the third embodiment of the present invention.

For example, a second torsion spring 40' which is the same kind as those in the first and second embodiment is shown in FIGS. 8 to 10, as the elastic body of the third embodiment.

The second torsion spring 40' applies elasticity in the same structure as the first torsion sprint 40. However, the rotational angle of the circular center ring 41 has to be smaller than that of the first torsion spring 40 so that the opening direction of the coupling portions 42 and 43 is always the same as the returning direction of the lock lever 30 without the second coupling portion 43 moving beyond the dead point D and elasticity is applied in the locking direction of the lock lever 30.

Accordingly, in the third embodiment, a second guide 23 is formed outside relative to the first guide 22 of the first and second embodiment so that the circular center ring 41 comes in contact with the second guide 23 to be limited in movement when the lock lever 30 is rotated to the unlocked mode position.

As the coupling portions 42 and 43 of the second torsion spring 40' are closed, the locked lever 30 is always elastically supported to the locked mode position.

The second torsion spring 40' has the same configuration of the first torsion spring 40 except for the movement range of the circular center ring 41.

Figure 11A:
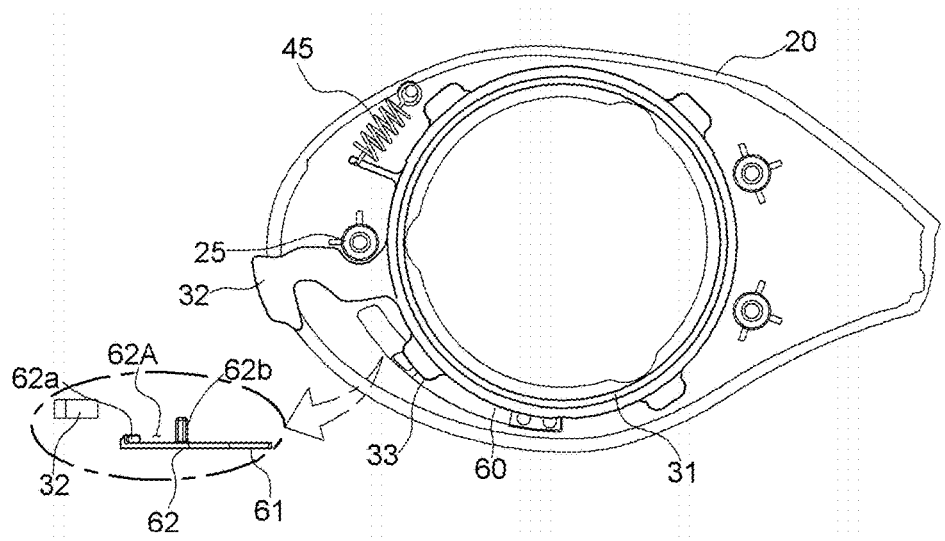
Figure 11B:
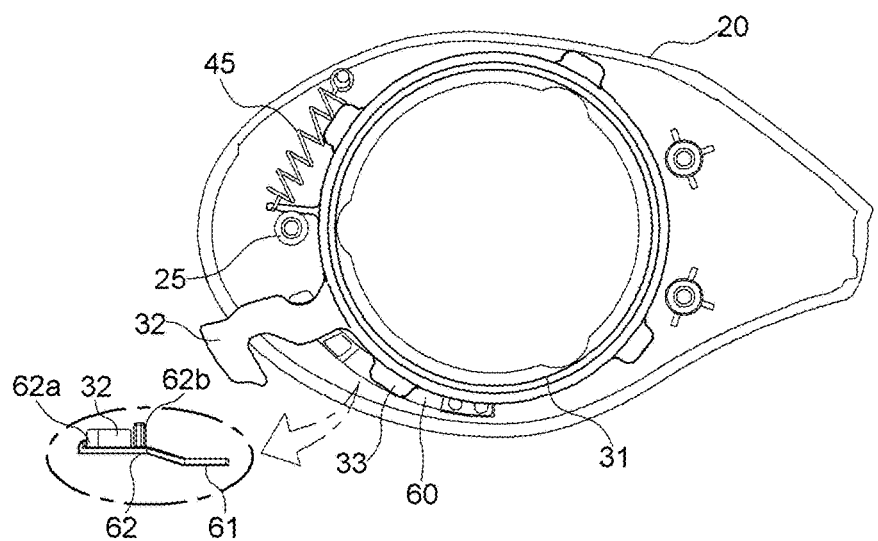
Figure 11C:
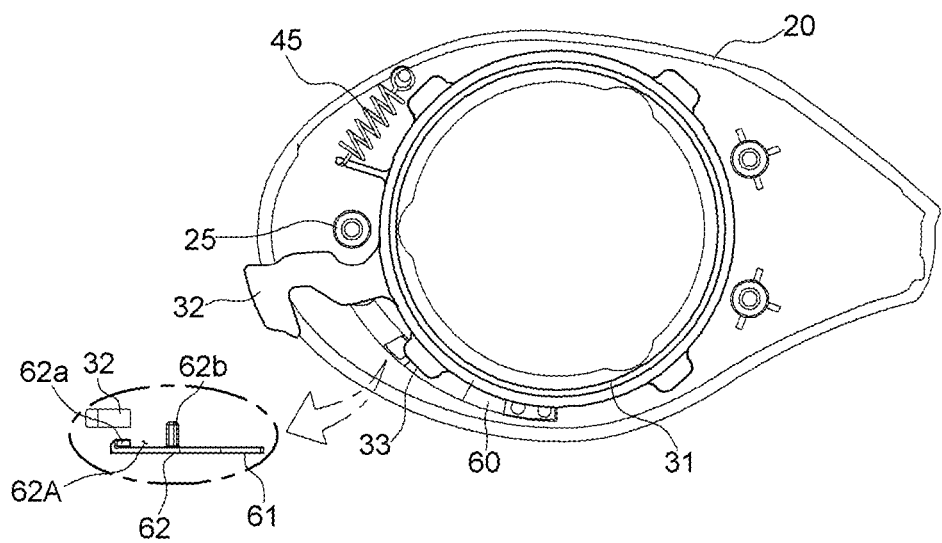

As another example, a tension spring 45 applying elasticity in a compressing direction is shown as the elastic body of the third embodiment in FIGS. 11A to 11C.

The tension spring 45 has a first end connected to the inner side of the side cover and a second end connected to the outer side of the rotor of the lock lever 30.

Both ends of the tension spring 45 are moved away from each other when the lock lever 30 is rotated in the unlocking direction, so the lock lever 30 is always elastically supported to the locked mode position.

Referring to FIGS. 8 to 11C, the lock spring 60 has a fixed part 61 fitted on projections 26 protruding from the inner side of the side cover 20, a supported part 62 connected to the fixed portion 61 and elastically supported inward (toward the frame 10), a locking portion 62a protruding inward at a first end of the supported part 62, and a boss portion 62b protruding inward at a second end of the supported portion 62, a seat 62A for locking the grip 32 is formed between the locking portion 62a and the boss portion 62b.

When the side cover 20 is recombined with the frame 10 after being separated, the boss portion 62b comes in contact with the frame 10 and the supported portion 62 is pressed, so the grip 32 is separated out of the seat 62A and the lock lever 30 is returned.

Accordingly, as shown in FIGS. 9A and 11A, when the side cover 20 is combined with the frame 10, the boss portion 62b is pressed by the frame 10, so the supported part 62 is pressed outward (toward the side cover 20). Further, from this state, when the lock lever 30 is rotated to the unlocked position to separate the side cover 20, as shown in FIGS. 9B and 11B, the grip 32 is moved over the seat 62A and the side cover 20 can be separated from the frame 10.

When the side cover 20 is separated from the frame 10, the boss portion 62b that has been pressed is released, so the supported part 62 returns inward and the grip 32 is inserted into the seat 62A and locked between the locking portion 62a and the boss portion 62b.

In this state, even though elasticity of the elastic body keeps being applied, the lock spring 60 holds the grip 32, so the lock lever 30 is fixed at the position.

Thereafter, when the side cover 20 is recombined with the frame 10, the boss portion 62b comes in contact with the frame 10 and the supported portion 62 is pressed, so the grip 32 is separated out of the seat 62A and the lock lever 30 is returned to the safety lock mode position by the elasticity of the elastic body, as shown in FIGS. 9C and 11C, thereby primarily preventing separation f the side cover 20.

Thereafter, when a user rotates again the lock lever 30 to the locked mode position, the side cover 20 is completely recombined.

According to the present invention, a safety lock including the first torsion spring 40, the trigger 50 or the elastic body (second torsion spring 40' or tension spring 45), and the lock spring 60 to operate the lock lever 30 in three steps, so when the side cover 20 needs to be separated during fishing, it is possible to prevent the side cover 20 that has not be completely combined from being unlocked and separated due to a mistake such as misjudgment of a user and to easily separate and recombine the side cover 20 using the lock lever 30.

Although a fishing reel with a side cover safety lock having a specific shape and structure with reference to the accompanying drawings, the present invention may be changed, modified, and replaced in various ways by those skilled in the art, and the change, modification, and replacement should be construed as being included in the protective range of the present invention.

What is claimed is:

1. A fishing reel with a side cover safety lock, the fishing reel comprising:
   a frame having locking grooves;
   a side cover detachably coupled to a first side of the frame;
   a lock lever coupled to the side cover to rotate in two directions and having a grip and locking projections selectively locked into the locking grooves when the lock lever is rotated in two direction through the grip; and
   a safety lock preventing separation of the side cover by rotating the lock lever such that the locking projections are locked into the locking grooves when the side cover is recombined with the frame after being separated,
   wherein the safety lock includes:
   a torsion spring elastically supporting and rotating the lock lever in a locking direction and an unlocking direction from a dead point to prevent the lock lever from returning by applying elasticity in the unlocking direction when the lock lever is rotated to separate the side cover and to allow the lock lever to return by applying elasticity in the locking direction when the side cover is recombined with the frame after being separated; and
   a trigger pressing the lock lever beyond the dead point such that the lock lever is returned by the torsion spring when the side cover is recombined with the frame after being separated.

2. The fishing reel of claim 1, wherein the trigger has an operating portion having a pressed surface connected to the lock lever and a pushing projection formed on the frame to correspond to the pressed surface, and
   when the side frame is recombined with the frame after being separated, the pushing projection presses the operating portion and the lock lever is returned.

3. The fishing reel of claim 1, wherein the trigger has an operating portion having a pressed surface connected to the lock lever and a pushing pin coupled to the side cover to move up and down and having a pressing surface corresponding to the pressed surface, and
   when the side frame is recombined with the frame after being separated, the pushing pin is pressed by the frame and presses the operating portion and the lock lever is returned.

4. A fishing reel with a side cover safety lock, the fishing reel comprising:
- a frame having locking grooves;
- a side cover detachably coupled to an outer side of the frame;
- a lock lever coupled to the side cover to rotate in two directions and having a grip and locking projections selectively locked into the locking grooves when the lock lever is rotated in two direction through the grip; and
- a safety lock preventing separation of the side cover by rotating the lock lever such that the locking projections are locked into the locking grooves when the side cover is recombined with the frame after being separated, wherein the safety lock includes:
an elastic body elastically supporting the lock lever in the locking direction; and
a lock spring locking the lock lever such that the lock lever is prevented from returning by the elastic body when the lock lever is rotated to separate the side cover, and releasing the lock lever such that the lock lever is returned by the elastic body when the side cover is recombined with the frame after being separated.

\* \* \* \* \*